(12) United States Patent
Marchlewski et al.

(10) Patent No.: US 10,894,502 B2
(45) Date of Patent: Jan. 19, 2021

(54) TIE DOWN SYSTEMS FOR SECURING CARGO WITHIN VEHICLE CARGO SPACES

(71) Applicant: FORD GLOBAL TECHNOLOGIES, LLC, Dearborn, MI (US)

(72) Inventors: Jack Marchlewski, Saline, MI (US); Vince Anthony Chimento, Plymouth, MI (US); Robert Reiners, Grosse Ile, MI (US); Jeffrey Gray, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 128 days.

(21) Appl. No.: 15/972,289

(22) Filed: May 7, 2018

(65) Prior Publication Data
US 2019/0337441 A1 Nov. 7, 2019

(51) Int. Cl.
*B60P 7/08* (2006.01)
*B60P 1/00* (2006.01)

(52) U.S. Cl.
CPC ............. *B60P 7/0815* (2013.01); *B60P 1/003* (2013.01); *B60Y 2200/14* (2013.01)

(58) Field of Classification Search
CPC ......... B60P 7/0807; B60P 1/003; B60P 3/055; B60P 3/073; B60P 7/0815; B60P 1/435; B60P 3/07
USPC ............... 410/101, 102, 104, 106, 115, 143; 224/403, 405, 484, 543, 546, 548; 296/26.09, 3, 37.6
See application file for complete search history.

(56) References Cited

U.S. PATENT DOCUMENTS

| 5,117,532 | A | * | 6/1992 | Holland | B62D 33/0273 |
| | | | | | 16/221 |
| 5,951,092 | A | * | 9/1999 | Cissell | B60J 7/102 |
| | | | | | 296/100.12 |
| 5,988,722 | A | | 11/1999 | Parri | |
| 7,080,966 | B2 | | 7/2006 | Roh | |
| 7,819,295 | B2 | | 10/2010 | Plavetich | |
| 8,403,191 | B2 | | 3/2013 | Russo | |
| 9,016,750 | B2 | * | 4/2015 | Izydorek | B60R 5/04 |
| | | | | | 296/37.6 |
| 9,663,016 | B1 | | 5/2017 | Sutton | |
| 9,745,002 | B2 | * | 8/2017 | Eddings, Jr. | B62D 33/0207 |
| 10,035,470 | B2 | * | 7/2018 | Pulleyblank | E05C 9/021 |
| 2008/0014041 | A1 | | 1/2008 | Randazzo et al. | |
| 2016/0325669 | A1 | | 11/2016 | Byham | |
| 2017/0240092 | A1 | * | 8/2017 | Nouri | F16B 2/245 |

\* cited by examiner

*Primary Examiner* — D Glenn Dayoan
*Assistant Examiner* — Sunsurraye Westbrook
(74) *Attorney, Agent, or Firm* — David Coppiellie; Carlson, Gaskey & Olds

(57) ABSTRACT

This disclosure details tie down systems for securing cargo within vehicle cargo spaces. An exemplary tie down system may include a corner bracket mounted in a corner of the cargo space. The corner bracket may include a plurality of openings for tying down cargo at different heights within the cargo space.

9 Claims, 9 Drawing Sheets

TIE DOWN SYSTEMS FOR SECURING CARGO WITHIN VEHICLE CARGO SPACES

TECHNICAL FIELD

This disclosure relates to tie down systems for securing cargo at different heights within vehicle cargo spaces.

BACKGROUND

A pickup truck includes a truck bed that serves as a cargo space for transporting various types of cargo. A tailgate is positioned at a rearward end of the truck bed. The tailgate is movable between an upright, closed position and a horizontal, open position to selectively provide access to the truck bed. A customer may desire to haul cargo of varying heights within the truck bed. Truck bed tie downs are typically only offered at a single height, thereby making it difficult to tie down cargo at different heights.

SUMMARY

A tie down system for a vehicle according to an exemplary aspect of the present disclosure includes, among other things, a first corner bracket, a first opening formed in the first corner bracket and disposed at a first height of the first corner bracket, and a second opening formed in the first corner bracket and disposed at a second height of the first corner bracket.

In a further non-limiting embodiment of the foregoing system, the system includes a second corner bracket.

In a further non-limiting embodiment of either of the foregoing systems, a tying device is connected between the first corner bracket and the second corner bracket.

In a further non-limiting embodiment of any of the foregoing systems, the tying device includes a strap, a cable, or a cord.

In a further non-limiting embodiment of any of the foregoing systems, the first corner bracket includes an outer face, a first side face, and a second side face, and the first side face and the second side face curve toward one another.

In a further non-limiting embodiment of any of the foregoing systems, the first opening and the second opening extend through the outer face.

In a further non-limiting embodiment of any of the foregoing systems, a gap extends between a first end of the first side face and a second end of the second side face.

In a further non-limiting embodiment of any of the foregoing systems, the first corner bracket is triangular shaped or rectangular shaped and includes a hollow passage.

A vehicle according to another exemplary aspect of the present disclosure includes, among other things, a first wall and a second wall that meet together to establish a first corner of a cargo space of the vehicle, and a first corner bracket positioned within the first corner and mounted to each of the first wall and the second wall.

In a further non-limiting embodiment of the foregoing vehicle, the vehicle is a pickup truck, and the cargo space is a truck bed of the pickup truck.

In a further non-limiting embodiment of either of the foregoing vehicles, the vehicle includes a third wall meeting together with the second wall to establish a second corner of the cargo space, and a second corner bracket positioned within the second corner and mounted to each of the third wall and the second wall.

In a further non-limiting embodiment of any of the foregoing vehicles, the vehicle includes a tying device connecting between the first corner bracket and the second corner bracket.

In a further non-limiting embodiment of any of the foregoing vehicles, the vehicles includes a second corner bracket in a second corner, a third corner bracket in a third corner, and fourth corner bracket in a fourth corner of the cargo space.

In a further non-limiting embodiment of any of the foregoing vehicles, the vehicle includes a plurality of fasteners inserted through side faces of the first corner bracket and into the first wall and the second wall.

In a further non-limiting embodiment of any of the foregoing vehicles, the first corner bracket is a roll formed component that extends along a longitudinal axis between opposing end portions, and a plurality of openings are spaced apart from one another along the longitudinal axis.

In a further non-limiting embodiment of any of the foregoing vehicles, a strip section of the first corner bracket extends between adjacent openings of the plurality of openings.

In a further non-limiting embodiment of any of the foregoing vehicles, the first corner bracket is triangular shaped or rectangular shaped and includes a hollow passage.

In a further non-limiting embodiment of any of the foregoing vehicles, the first corner bracket includes an outer face that faces away from the first corner, and the outer face includes a plurality of openings configured to receive a portion of a tying device for tying down cargo within the cargo space.

In a further non-limiting embodiment of any of the foregoing vehicles, the first corner bracket includes a plurality of openings disposed at different heights of the first corner bracket.

A method according to another exemplary aspect of the present disclosure includes, among other things, positioning a cargo item within a vehicle cargo space, and tying down the cargo item with a first tying device and a second tying device that connect between a first corner bracket and a second corner bracket of a tie down system. The first and second tying devices are connected to the first and second brackets at different heights relative to a floor of the vehicle cargo space.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details tie down systems for securing cargo within vehicle cargo spaces. An exemplary tie down system may include a corner bracket mounted at a corner of the cargo space. The corner bracket may include a plurality of openings for tying down cargo at different heights within the cargo space. These and other features of this disclosure are described in greater detail in the following paragraphs of this detailed description.

Figure 1:
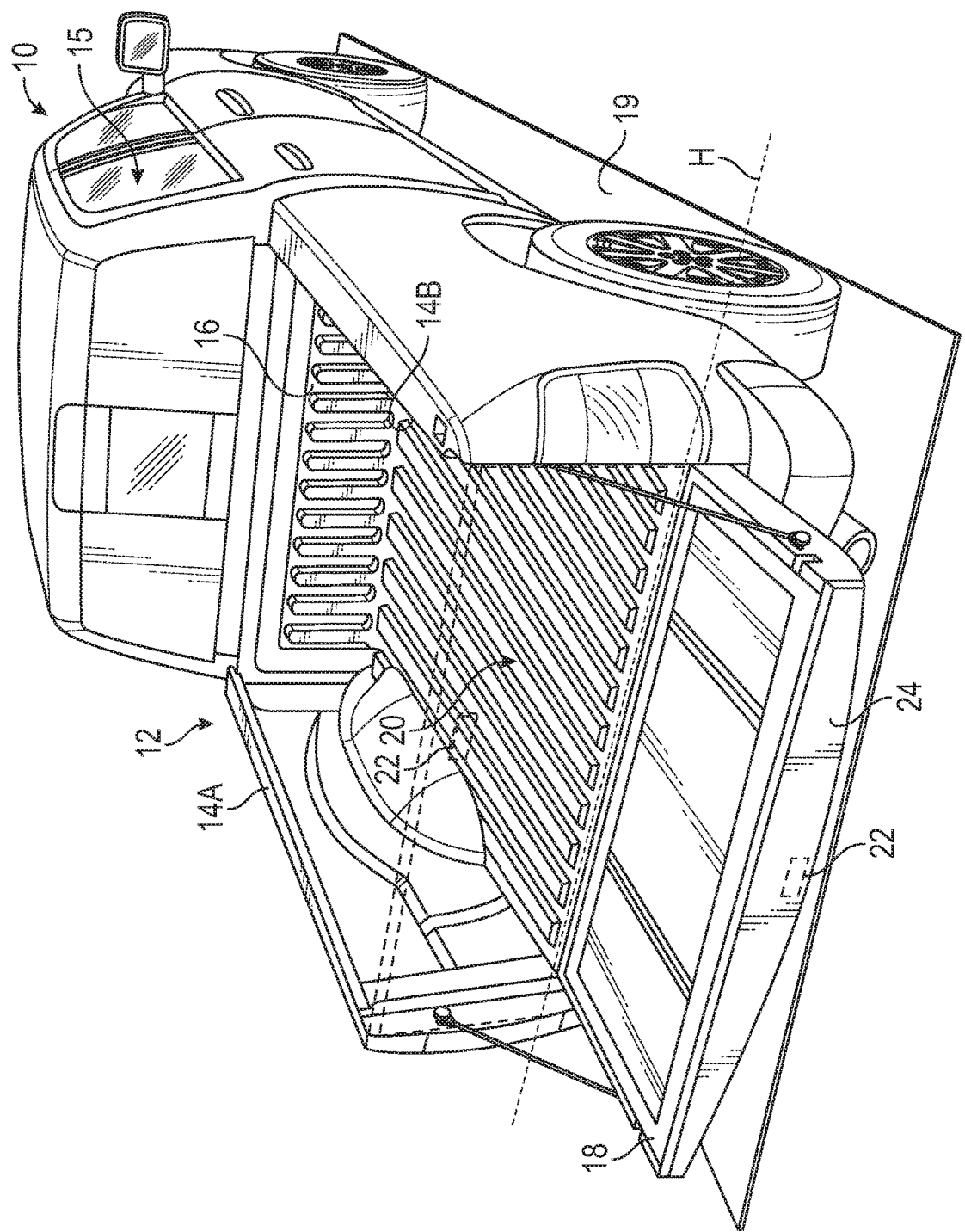
FIG. 1 illustrates a vehicle equipped with a cargo space for storing and hauling cargo at a rearward location of the vehicle.

FIG. 1 schematically illustrates a vehicle 10. In the illustrated embodiment, the vehicle 10 is a pickup truck. While a truck is pictured, other vehicles could also benefit from the teachings of this disclosure. For example, the exemplary tie down systems of this disclosure could be used to secure cargo within any vehicle cargo space.

Although a specific component relationship is illustrated in the figures of this disclosure, the illustrations are not intended to limit this disclosure. The placement and orientation of the various components of the vehicle 10 are shown schematically and could vary within the scope of this disclosure. In addition, the various figures accompanying this disclosure are not necessarily to scale, and some features may be exaggerated or minimized to show certain details of a particular component.

The vehicle 10 includes a truck bed 12 that establishes a cargo space for storing and hauling cargo at a rear location of the vehicle 10. The truck bed 12 is generally rearward of a passenger cabin 15 of the vehicle 10 and includes a floor 20 extending between a pair of longitudinally extending side walls 14A, 14B, a laterally extending front wall 16, and a tailgate 18.

The tailgate 18 is moveable between a closed position (shown in phantom) and a deployed or open position. When in the closed position, the tailgate 18 generally encloses an end of the truck bed 12 that is opposite from the front wall 16 to prevent cargo from sliding out of the truck bed 12. The tailgate 18 may be pivoted about a generally horizontal axis H to move it from the closed position to the open position and provide access to the truck bed 12. When in the open position, the tailgate 18 is generally horizontal and is parallel to a ground level 19 such that cargo can be loaded onto or unloaded from the truck bed 12.

A handle 22 is movably mounted to the tailgate 18. In use, a user can manually open the tailgate 18 by actuating the handle 22, thereby releasing the tailgate 18 for movement from the closed position to the open position.

The owner or user of the vehicle 10 may wish to load cargo within the truck bed 12. The cargo could include any size or shape, including shapes that are irregular. The owner or user of the vehicle 10 may therefore desire to secure or tie down the cargo at various heights for increasing the vehicle's load carrying capabilities. Tie down systems suitable for these purposes are discussed in greater detail below.

Figure 2:
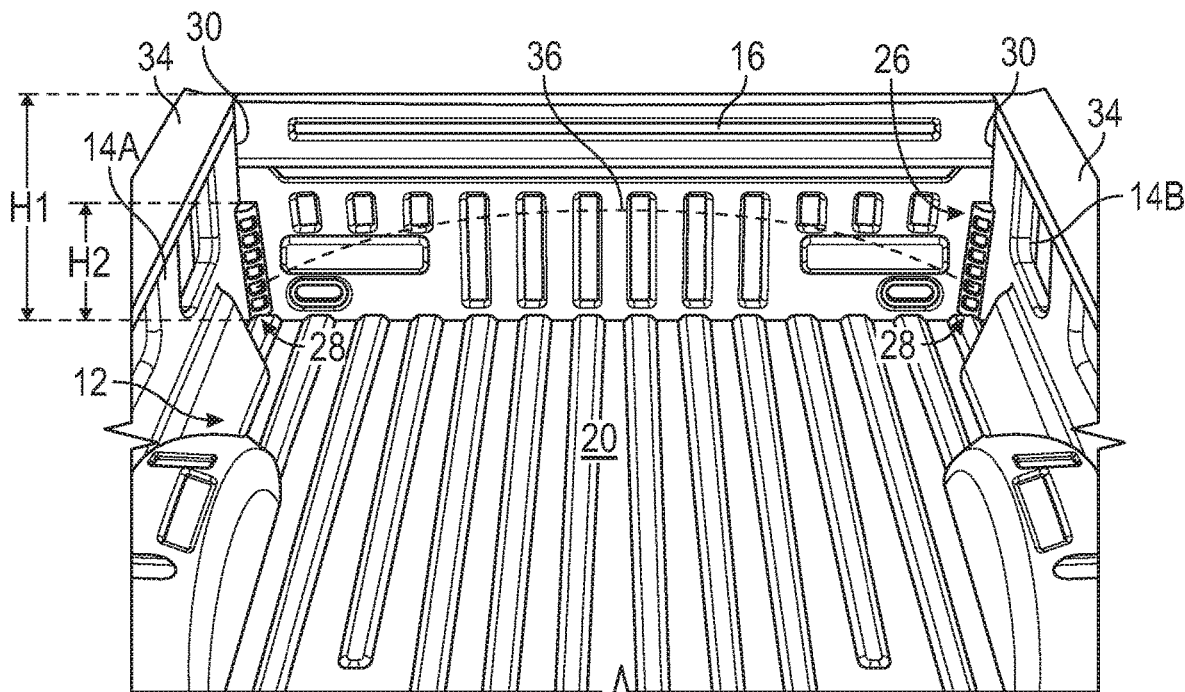
FIG. 2 illustrates a tie down system according to a first exemplary embodiment of this disclosure.

FIG. 2 illustrates an exemplary tie down system 26 for securing (i.e., tying down) cargo within the truck bed 12. The tie down system 26 may include one or more corner brackets 28 for tying down the cargo at different heights relative to the floor 20 of the truck bed 12. The corner brackets 28 may be mounted in one or more corners 30 of the truck bed 12. The total number of corner brackets 28 employed by the tie down system 26 is not intended to limit this disclosure.

Figure 3:
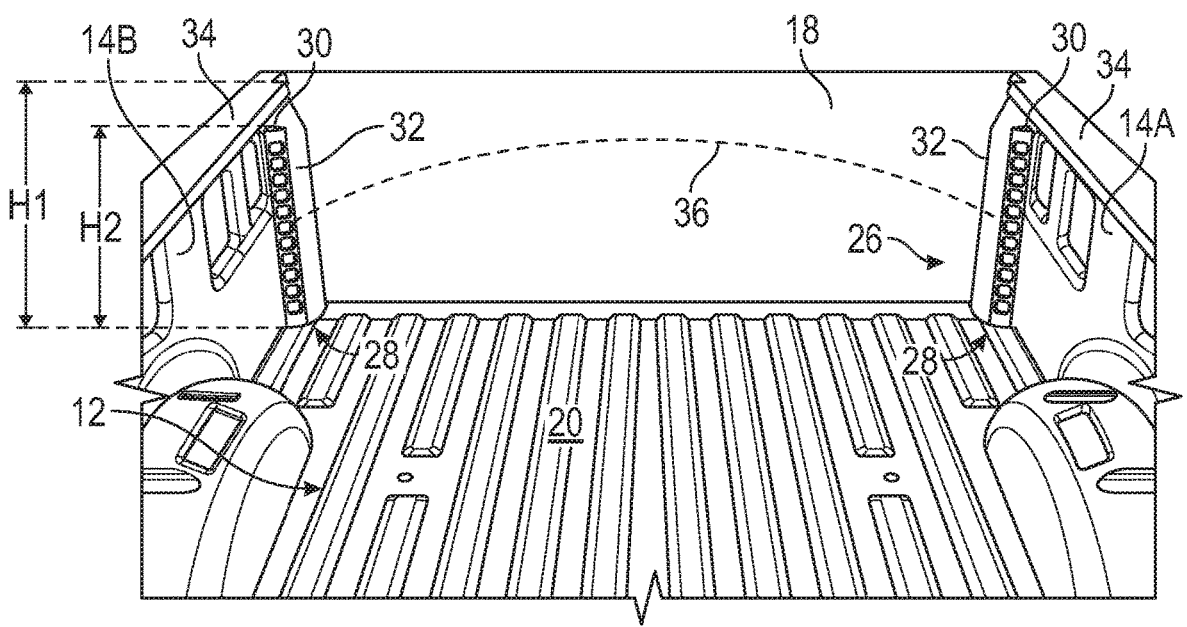
FIG. 3 illustrate a tie down system according to a second exemplary embodiment of this disclosure.
Figure 4:
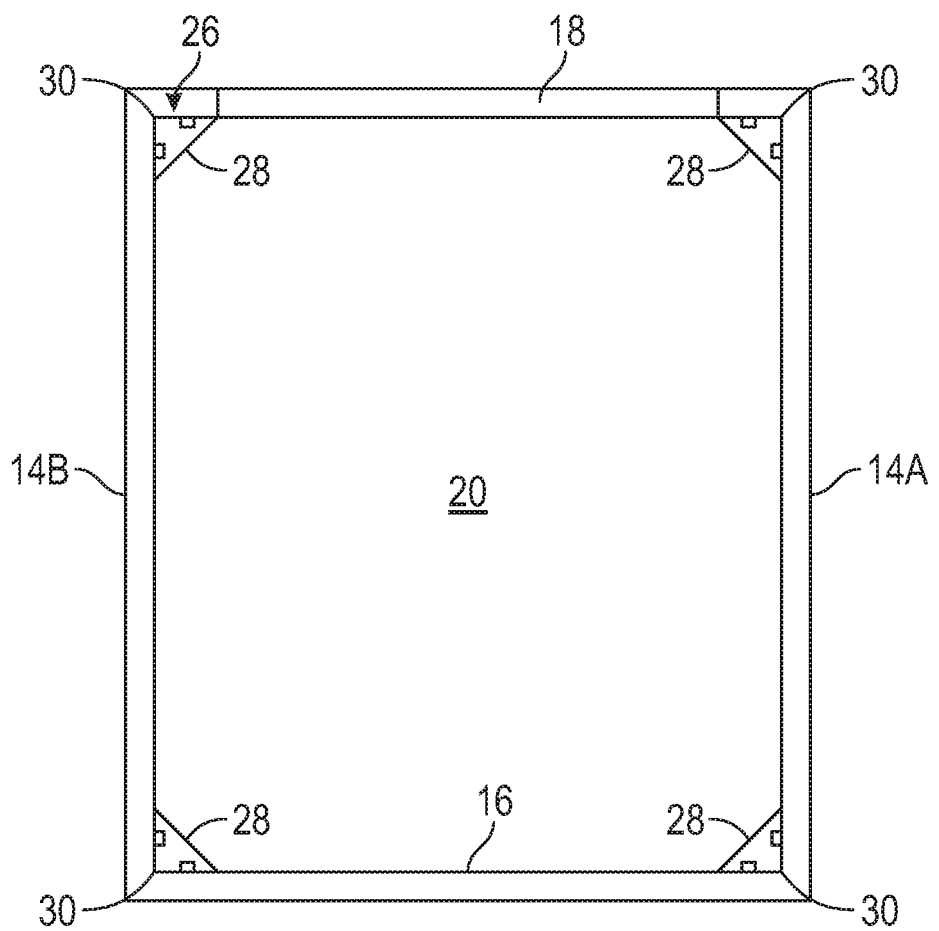
FIG. 4 illustrates a tie down system according to a third exemplary embodiment of this disclosure.
Figure 5A:
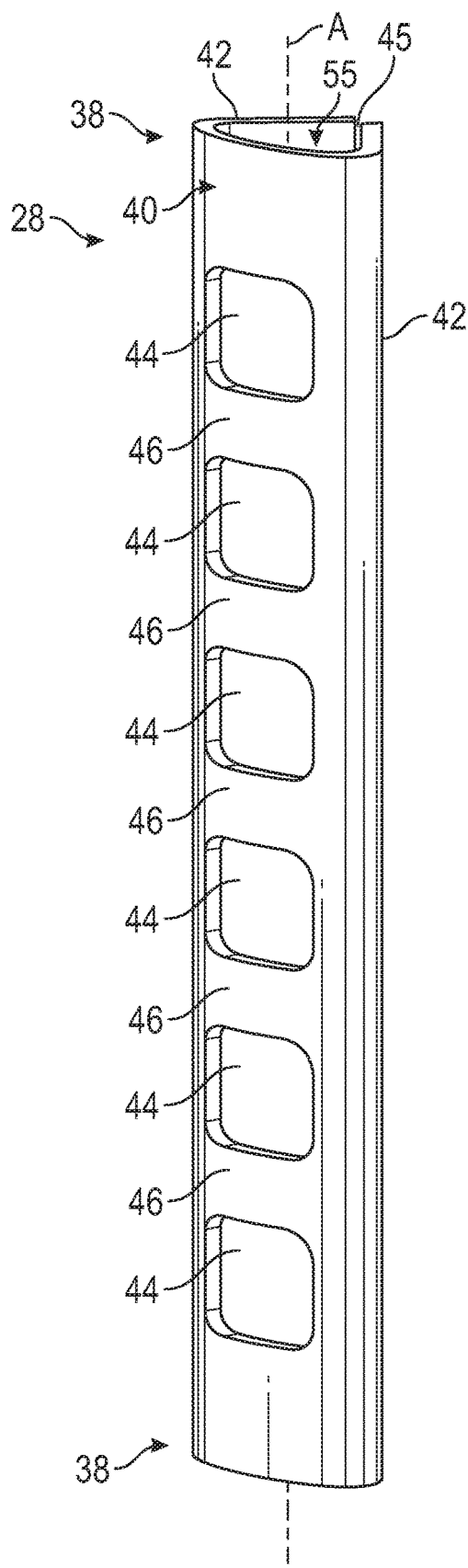
FIGS. 5A, 5B, 5C, and 5D illustrate a corner bracket of the tie down systems of FIGS. 2-4.
Figure 5B:
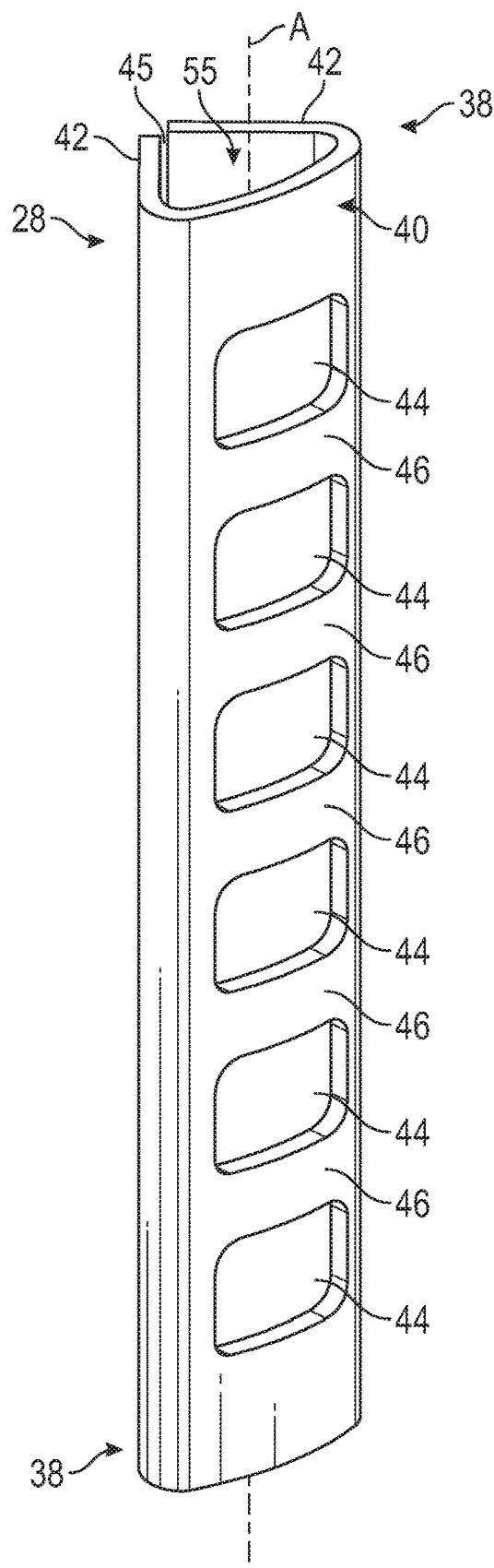
Figure 5C:
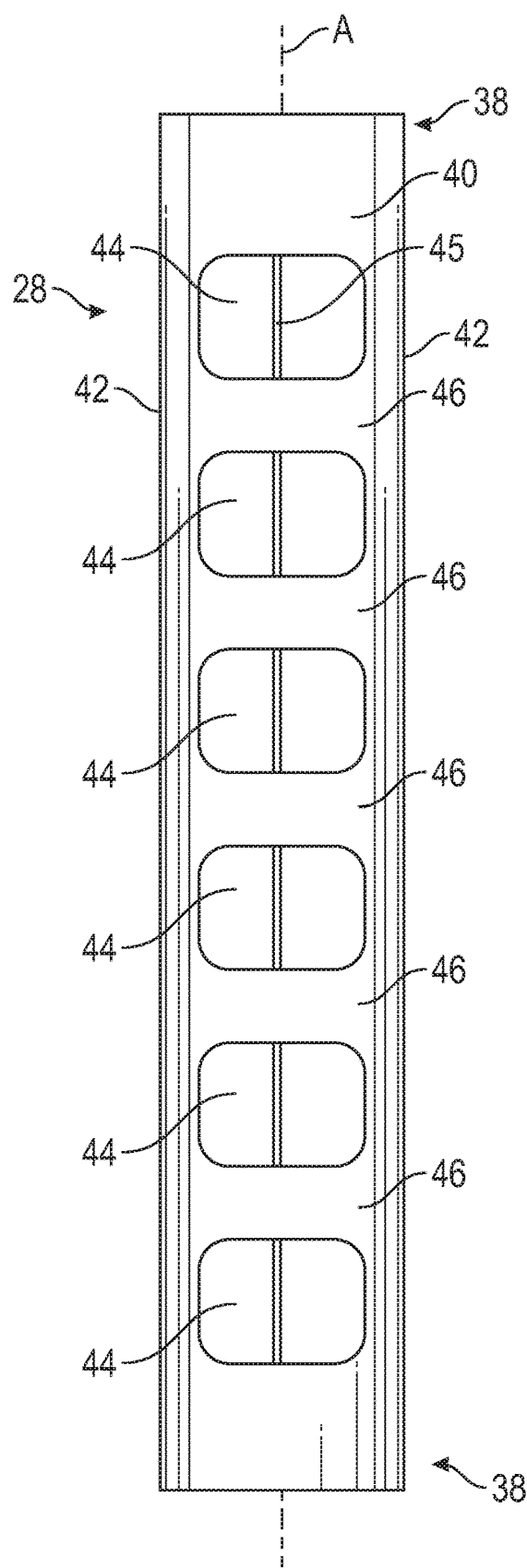
Figure 5D:
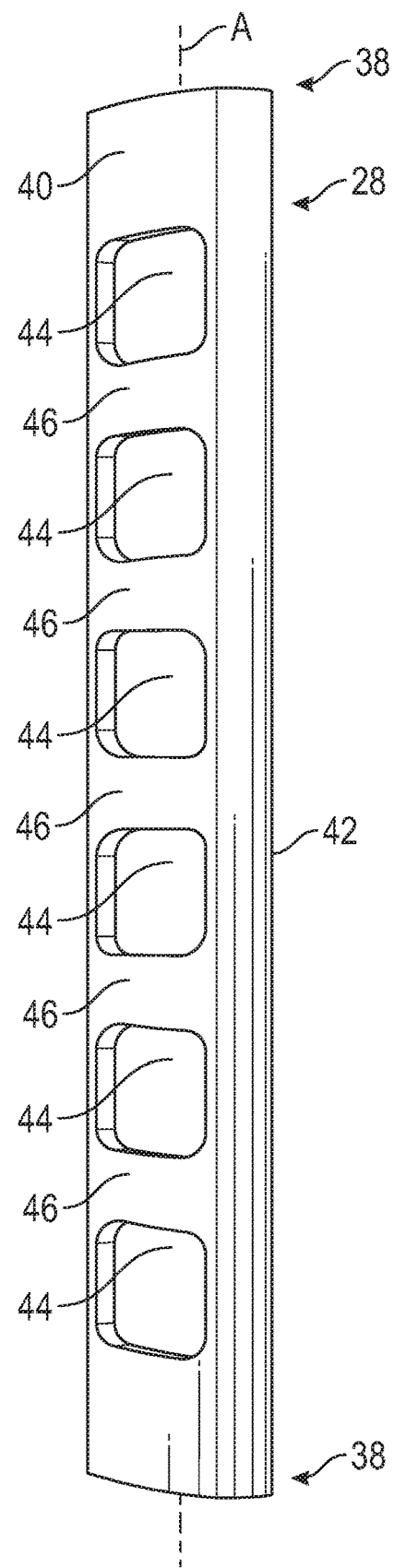

In an embodiment, the tie down system 26 includes one corner bracket 28 mounted in each corner 30 at the front of the truck bed 12 (i.e., where the side walls 14A, 14B meet the front wall 16, see, e.g., FIG. 2). In another embodiment, the tie down system 26 includes one corner bracket 28 mounted in each corner 30 at the rear of the truck bed 12 (i.e., where the side walls 14A, 14B meet rear walls 32 disposed on opposing sides of the tailgate 18, see, e.g., FIG. 3). In yet another embodiment, the tie down system 26 includes one corner bracket 28 located at each of the four corners 30 of the truck bed 12 (see FIG. 4).

Frame rails 34 of the side walls 14A, 14B are positioned at a first height H1 above the floor 20 of the truck bed 12. The corner brackets 28 may extend to a second height H2 above the floor 20. The second height H2 may be any height that is between the floor 20 and the first height H1, and could extend up to the first height H1. In an embodiment, the corner brackets 28 at the front of the truck bed 12 include different heights (e.g., smaller heights) than the corner brackets 28 at the rear of the truck bed 12 (compare FIG. 2 with FIG. 3).

One or more tying devices 36 (shown in phantom in FIGS. 2 and 3 for clarity) can be removably connected between any two of the corner brackets 28. Once connected to the corner brackets 28, the tying devices 36 exert a force for securing cargo within the truck bed 12. The tying device(s) 36 could be a strap, cord, bungee cord, cable, rope, band, or any combination of these or other tying devices.

FIGS. 5A-5D, with continued reference to FIGS. 1-4, illustrate an exemplary corner bracket 28 of the tie down system 26. The corner bracket 28 extends along a longitudinal axis A between opposing end portions 38. The corner bracket 28 may include an outer face 40 and a pair of side faces 42 that extend from the outer face 40. A hollow passage 55 extends through the corner bracket 28 between the opposing end portion 38.

Figure 6A:
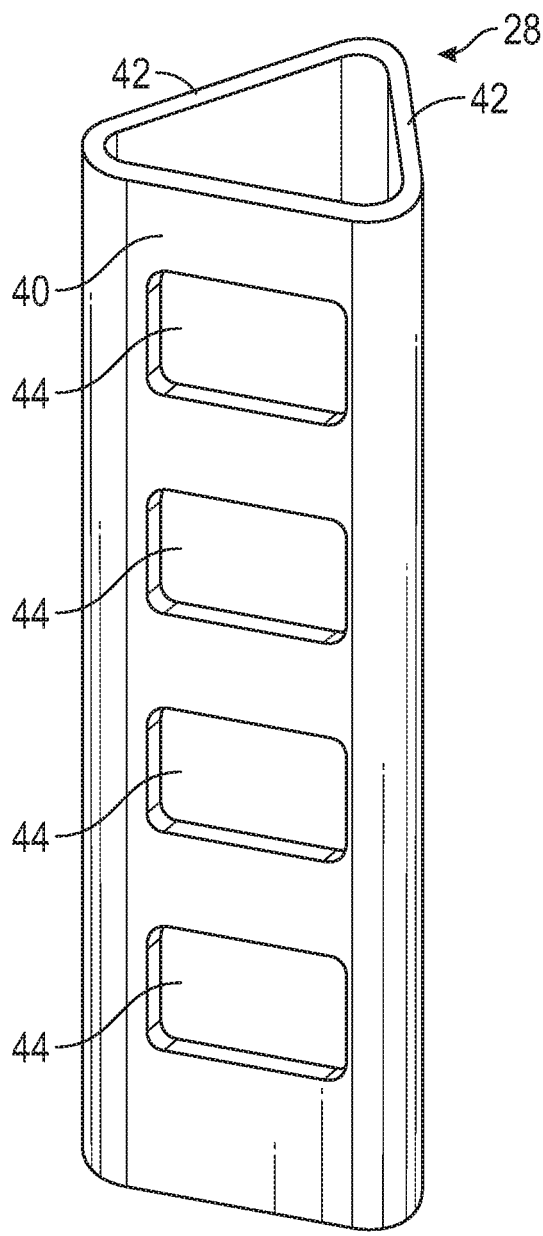
FIGS. 6A and 6B illustrate another exemplary corner bracket.
Figure 6B:
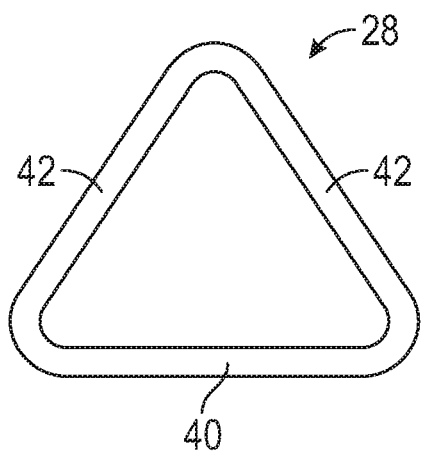
Figure 7A:
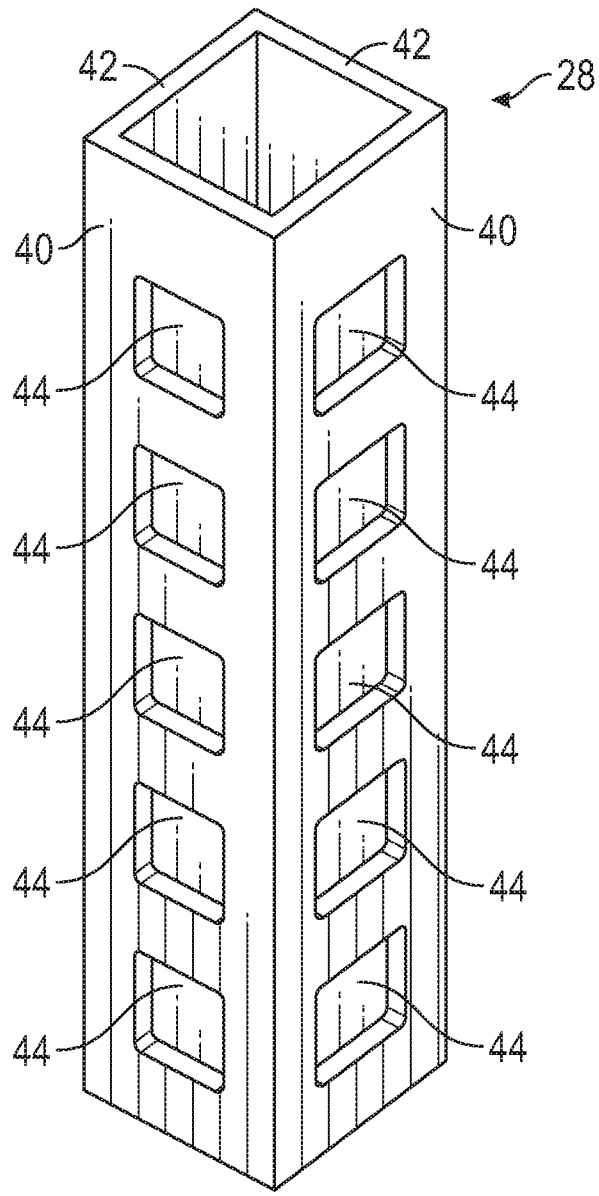
FIGS. 7A and 7B illustrate yet another exemplary corner bracket.
Figure 7B:
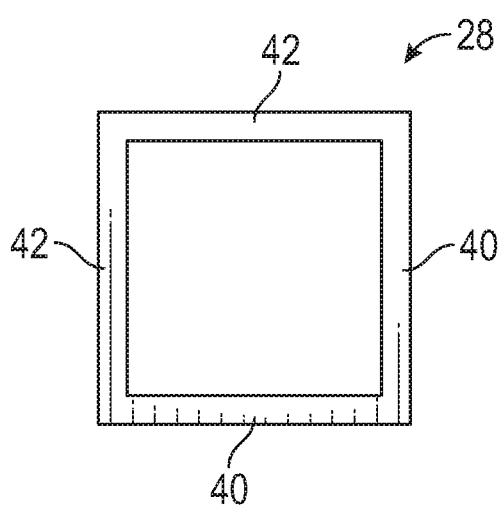

The side faces 42 may curve toward one another to establish a triangular shape of the corner bracket 28. In an embodiment, the side faces 42 are unconnected and thus establish an open or near-closed triangular shape. In other words, a gap 45 may extend between the side faces 42. In another embodiment, the side faces 42 of the corner bracket 28 join together to establish a closed triangular shape (see FIGS. 6A and 6B). In this embodiment, a gap does not extend between the side faces 42. In yet another embodiment, the corner bracket 28 is rectangular shaped and includes a pair of outer faces 40 and a pair of side faces 42 (see FIGS. 7A and 7B). The shape of the corner bracket 28 is not intended to limit this disclosure.

The corner bracket 28 may be a roll formed component that is manufactured using a roll forming process. Roll forming allows for the use of high-strength and advanced high-strength metallic materials that can provide high yield and tensile strengths for high load carrying capabilities. However, the corner bracket 28 could be constructed using other manufacturing techniques and could be made from any suitable material, including various metallic or plastic materials.

A plurality of openings 44 may be formed through the outer face 40 of the corner bracket 28. The openings 44 may be spaced apart from one another along the longitudinal axis A and are therefore positioned at different heights along the length of the corner bracket 28. The total number of openings 44 is not intended to limit this disclosure and could depend on the overall length of the corner bracket 28, among other factors.

The plurality of openings 44 may be separated from one another by strip sections 46 of the outer face 40. The openings 44 and the strip sections 46 cooperate to permit the tying device 36 (shown in FIGS. 2, 3, and 10) to be connected to the corner bracket 28. For example, a hook, clamp, or other fixation component of the tying device 36 may be received within one of the openings 44 and then latched to one of the strip sections 46 to secure the tying device 36 to the corner bracket 28.

In an embodiment, each of the plurality of openings 44 are rectangular shaped and include rounded corners. However, other shapes are also contemplated within the scope of this disclosure.

Figure 8:
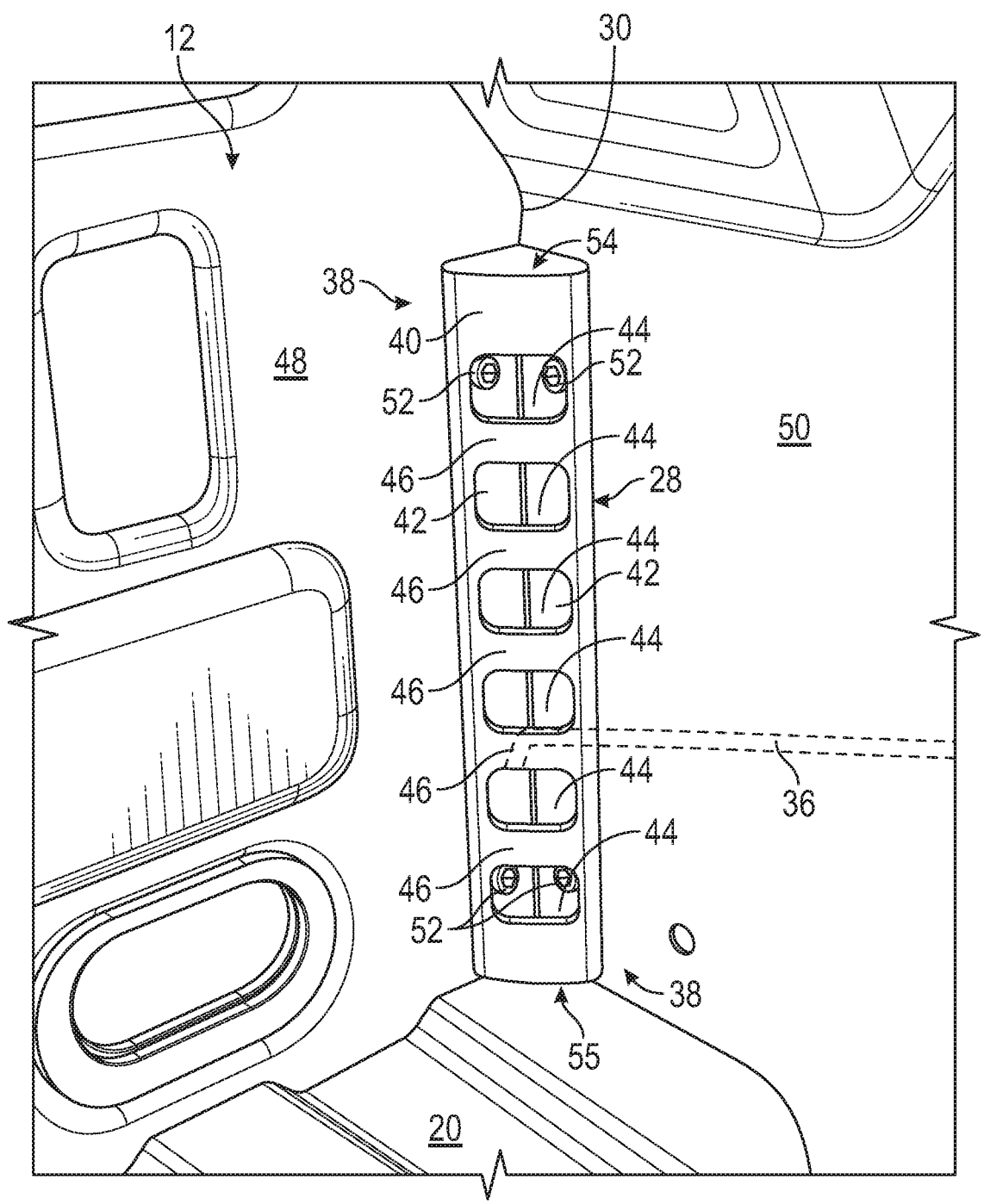
FIG. 8 illustrates the corner bracket of FIGS. 5A-5D mounted at a corner of a vehicle cargo space.

FIG. 8 illustrates the corner bracket 28 of FIGS. 5A-5D mounted at a corner 30 of the truck bed 12. The truck bed 12 (or other cargo space) may include a first wall 48 and a second wall 50 that meet together to establish the corner 30. The first wall 48 could be either of the side walls 14A, 14B of the truck bed 12 of FIG. 1, and the second wall 50 could be the front wall 16 or one of the rear walls 32 of the truck bed 12 of FIG. 1, for example.

The corner bracket 28 may be positioned within the corner 30 and then fixedly mounted to each of the first wall 48 and the second wall 50. In an embodiment, the corner bracket 28 is positioned within the corner 30 such that one of the side faces 42 of the corner bracket 28 is contiguous with the first wall 48 and the other side face 42 is contiguous with the second wall 50. Fasteners 52, such as threaded fasteners or bolts, may be then be inserted through the side faces 42 and into the first and second walls 48, 50 to mount the corner bracket 28 within the corner 30. In an embodiment, the fasteners 52 may be inserted through or accessed from the openings 44 of the outer face 40.

Once mounted, the outer face 40 of the corner bracket 28 faces in a direction away from the corner 30 so the tying device 36 can be easily connected to the openings 44 and strip sections 46. By mounting the corner bracket 28 to both the first wall 48 and the second wall 50 of the truck bed 12, tie down loads may be transferred between the adjacent walls 48, 50, thereby increasing the overall load carrying capability of the tie down system 26.

In another embodiment, an end cap 54 may be inserted to close-off the hollow passage 55 at the end portion 38 located at the top of the corner bracket 28. The end cap 54 may provide an aesthetically pleasing appearance and may also function to prevent debris from accumulating within the hollow passage 55 of the corner bracket 28.

Figure 9:
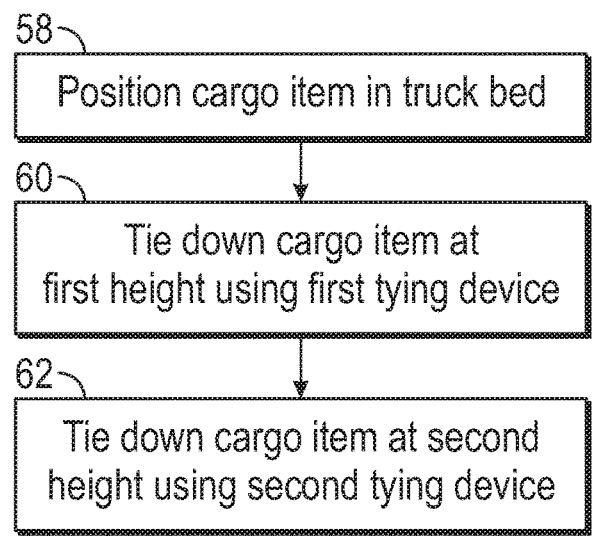
FIGS. 9 and 10 schematically illustrate an exemplary use of the tie down system of FIG. 2 for securing cargo at different heights.
Figure 10:
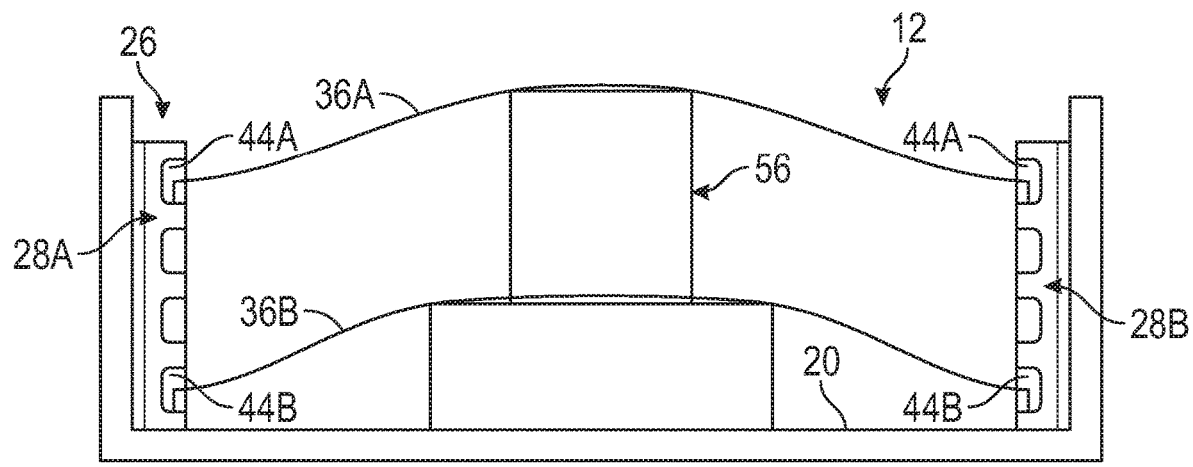

FIGS. 9 and 10, with continued reference to FIGS. 1-8, schematically illustrate an exemplary use of the tie down system 26 for tying down a cargo item 56 (see FIG. 10) within the truck bed 12. The cargo item 56 could be any cargo that the owner of the vehicle 10 desires to haul within the truck bed 12. Although shown as tying down a single cargo item 56 in FIG. 10, the tie down system 26 could be employed to simultaneously tie down a plurality of cargo items.

In an exemplary embodiment, the cargo item 56 can be tied down or secured relative to the truck bed 12 in the following non-limiting manner First, at block 58, the cargo item 56 is positioned within the truck bed 12, such as against the floor 20.

Next, at block 60, the cargo item 56 is tied down by a first tying device 36A located at a first height of the cargo item 56. This may include connecting the first tying device 36A within a first opening 44A of a first bracket 28A of the tie down system 26, routing the first tying device 36A either through or around the cargo item 56, and then connecting an opposite end of the first tying device 36A within a first opening 44A of a second bracket 28B of the tie down system 26. The first openings 44A are positioned at generally the same height relative to the floor 20 of the truck bed 12. It should be understood that an alternative embodiment is contemplated in which the first tying device 36A is routed through or around the cargo item 56 prior to connecting the first tying device 36A to the first and second corner brackets 28A, 28B.

The cargo item 56 may be tied down by a second tying device 36B at block 62. The second tying device 36B may tie down the cargo item 56 at a different height compared to the first tying device 36A. The second tying device 36B may be connected within a second opening 44B of the first bracket 28A of the tie down system 26, may be routed either through or around the cargo item 56, and may then be connected within a second opening 44B of the second bracket 28B of the tie down system 26. The second openings 44B are positioned at generally the same height relative to the floor 20 of the truck bed 12 and are located at a different height compared to the first openings 44A. It should be understood that an alternative embodiment is contemplated in which the second tying device 36B is routed through or around the cargo item 56 prior to connecting the second tying device 36B to the first and second corner brackets 28A, 28B.

The tie down systems of this disclosure provide users with the ability to tie down cargo at multiple height locations of the cargo for increased cargo stability and retention. In addition, the corner brackets of the tailgate tie down systems disclosed herein may be secured within the corners of a cargo space, thereby increasing tie down load carrying capability by transferring loads between adjacent walls of the cargo space.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A tie down system for a vehicle, comprising:
a first corner bracket;

a first opening formed in the first corner bracket and disposed at a first height of the first corner bracket;

a second opening formed in the first corner bracket and disposed at a second height of the first corner bracket;

a second corner bracket; and a tying device connecting between the first corner bracket and the second corner bracket, wherein the tying device hooks or clamps within openings of each of the first corner bracket and the second corner bracket, wherein the first corner bracket includes an outer face, a first side face, and a second side face, and the first side face and the second side face curve toward one another, wherein the first side face and the second side face of the first corner bracket join together to establish a closed triangular shape.

2. The system as recited in claim 1, wherein the tying device includes a strap, a cable, or a cord.

3. The system as recited in claim 1, wherein the first opening and the second opening extend through the outer face.

4. The system as recited in claim 1, wherein a gap extends between a first end of the first side face and a second end of the second side face.

5. The system as recited in claim 1, wherein the first corner bracket includes a hollow passage.

6. A method, comprising:

positioning a cargo item within a vehicle cargo space;

tying down the cargo item with a first tying device and a second tying device that connect between a first corner bracket and a second corner bracket of a tie down system;

wherein the first and second tying devices are connected to the first and second brackets at different heights relative to a floor of the vehicle cargo space.

7. The method as recited in claim 6, wherein tying down the cargo item includes:

connecting the first tying device within a first opening of the first corner bracket;

routing the first tying device through or around the cargo item; and connecting the first tying device within a first opening of the second corner bracket.

8. The method as recited in claim 7, wherein tying down the cargo item includes:

connecting the second tying device within a second opening of the first corner bracket;

routing the second tying device through or around the cargo item; and connecting the second tying device within a second opening of the second corner bracket, wherein the second openings are positioned at a different height than the first openings.

9. A tie down system for a vehicle, comprising:

a first corner bracket;

a first opening formed in the first corner bracket and disposed at a first height of the first corner bracket;

a second opening formed in the first corner bracket and disposed at a second height of the first corner bracket;

a second corner bracket; and a tying device connecting between the first corner bracket and the second corner bracket, wherein the tying device hooks or clamps within openings of each of the first corner bracket and the second corner bracket, wherein the first corner bracket is triangular shaped or rectangular shaped and includes a hollow passage; and an end cap attached to the first corner bracket and configured to close-off the hollow passage.

\* \* \* \* \*